Nov. 13, 1956
E. R. DAVIS
2,770,152
CIRCULAR SAW BLADE SHARPENING DEVICE
Filed April 19, 1955
2 Sheets-Sheet 2
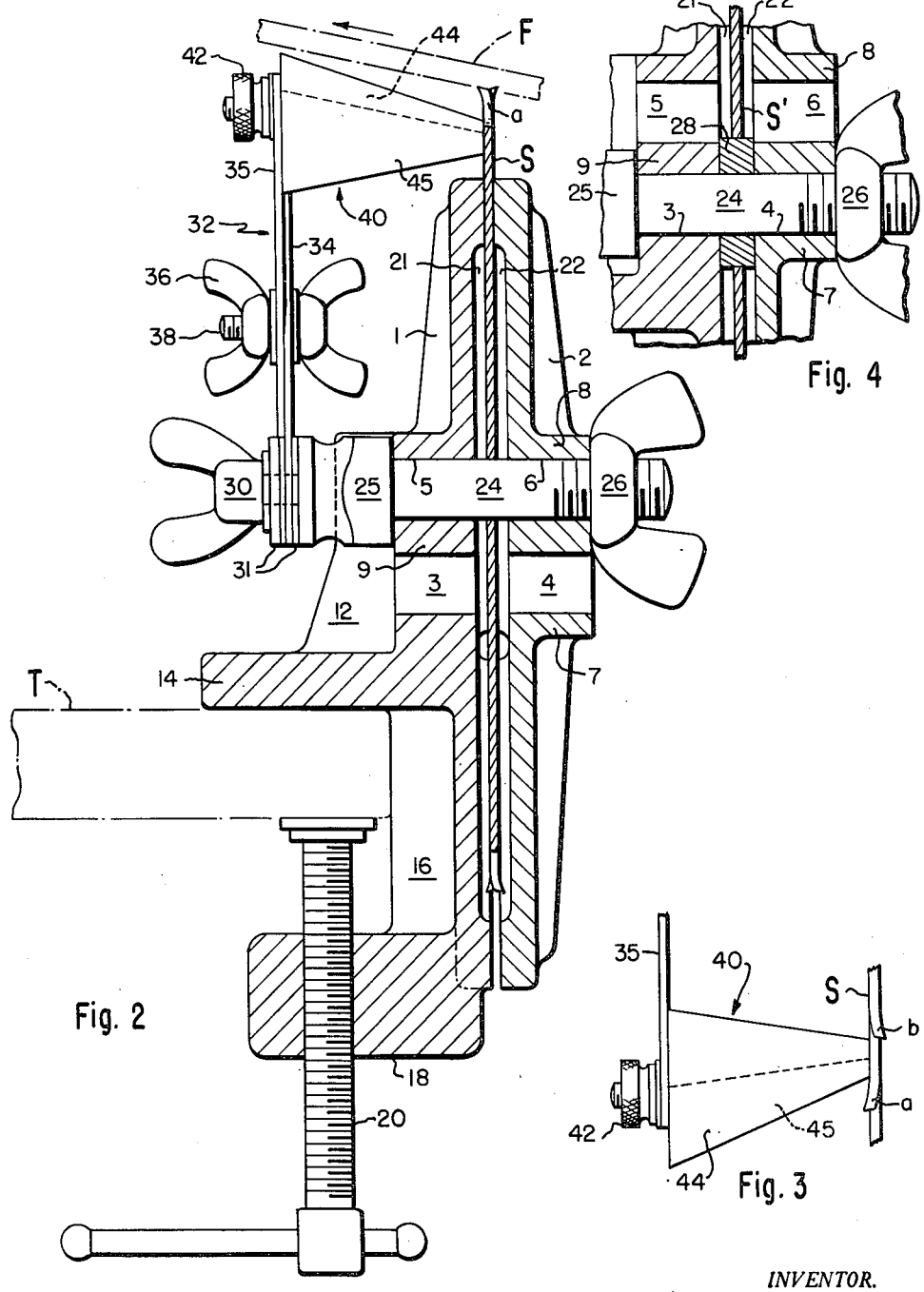
INVENTOR.
ELWOOD R. DAVIS
ATTORNEYS

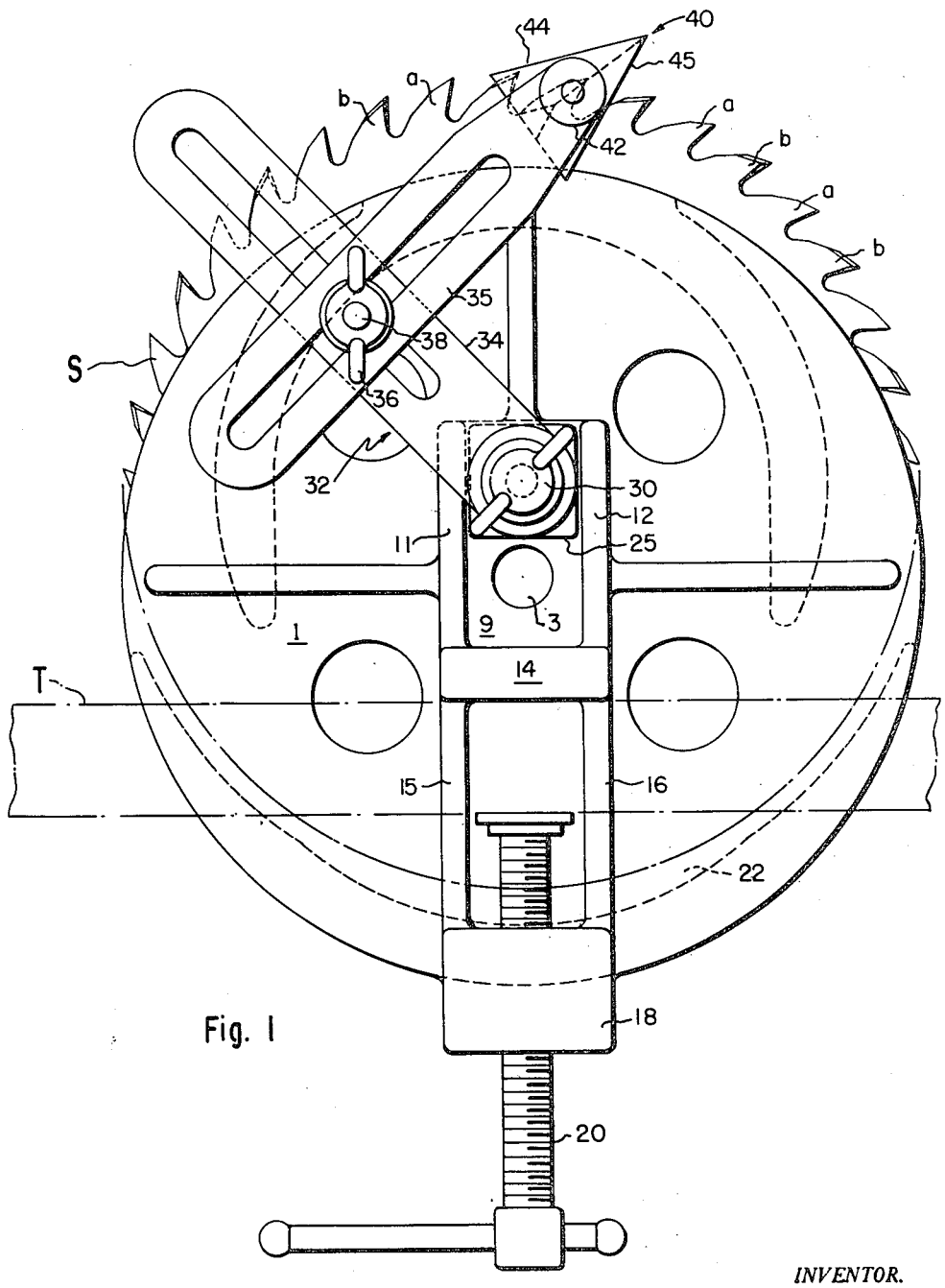
Fig. I

United States Patent Office 2,770,152
Patented Nov. 13, 1956

2,770,152

CIRCULAR SAW BLADE SHARPENING DEVICE

Elwood R. Davis, Keene, N. H., assignor to Harrington & Richardson, Inc., a corporation of Massachusetts Application April 19, 1955, Serial No. 502,491

8 Claims. (Cl. 76—36)

This invention relates to an apparatus for resharpening circular saws and as illustrative of its utility the invention is shown as applied to the resharpening of a so-called combination circular saw.

In sharpening circular saws it is necessary in order to achieve efficient cutting to provide the proper clearance, hook angle, slope to the front and back of the teeth, and in some cases the rake—depending upon the particular type of saw. Such sharpening operations are originally done at the factory where special machines are available, but after having been in use it is not feasible to send the saw back to the factory or elsewhere and hence it is usually necessary to resharpen the teeth with a file in order to maintain proper operation.

Resharpening with a file presents many difficulties, the most troublesome of which are providing the proper slope to the front and back of the teeth and maintaining the desired hook angle, since the operator has nothing which will provide a proper guide or gauge.

The principal objects of the present invention are to overcome the aforementioned difficulties and to provide a simple and efficient saw holding device having reliable means which will permit the operator to resharpen a circular saw so as to insure the proper clearance, slope and hook angle; and to provide a saw holding device which may be used with saws of different diameters.

Further objects relate to various features of construction and will be apparent from a consideration of the following description and accompanying drawings, wherein:

Fig. 1 is a side elevation of a saw holding device constructed in accordance with the present invention;

Fig. 2 is a diametric section through the device shown in Fig. 1;

Fig. 3 is a detail showing the guage element or block; and

Fig. 4 is a vertical section showing an adaptor carried by the blade-supporting stud.

In accordance with the present invention I provide a device comprising a pair of clamping jaws having at least one pair of aligned openings which receive a stud or the like on which the blade to be sharpened is supported between the jaws. A pivotally mounted arm, concentric with the saw blade which is supported on the stud, carries a gauge member or block having one face in a plane substantially parallel and closely spaced to the plane in which the front faces of alternate teeth of the blade are to be filed and a second face in a plane substantially parallel and closely spaced to the plane in which the back faces of the alternate teeth are to be filed.

The pivotal arm is preferably mounted on one end of the blade-supporting stud and is preferably extensible so that the device may accommodate saws of different diameters. The gauge block is preferably adjustable on the arm so that it may be used with blades having different slopes and hook angles, and it may be interchangeable with one or more gauge blocks designed for different types of saws.

The blade-supporting stud preferably serves not only as a part of the jaw-clamping means, in which case it is provided with a threaded end carrying a thumb nut or the like, but also as a support on which the pivotal arm is mounted. Although many saw blades are provided with circular shaped concentric openings which vary in size according to the diameters, others are provided with non-circular openings to prevent slippage when in use. In either case it is understood that the blade-supporting stud is to be provided with proper bushings or adapters and the inner or clamping faces of the jaws are recessed to accommodate such adapters.

In using the device the front and back of alternate teeth are first filed, as hereinafter shown, and the blade is then reversed and the other teeth are then filed, after which the resharpened teeth are set if necessary or desirable.

The embodiment herein shown for the purpose of illustration comprises a pair of circular jaws 1 and 2 formed with concentric openings 3 and 4 and aligned eccentric openings 5 and 6 (Fig. 2). The diameter of these openings are the same as the opening of the smallest saw blade to be operated on, namely, one-half inch which is the size for conventional blades up to seven inches in diameter. The outer face of the jaw 2 surrounding the openings 4 and 6 are provided with bosses 7 and 8 which provide bearing surfaces and corresponding bosses 9 and 10 surround the openings 3 and 5 on the outer face of the jaw 1. Triangular shaped spaced ribs 11 and 12 project outwardly from the outer face of the jaw 1 on each side of the bosses 9 and 10, and the lower ends of these ribs are integral with a web 14 which provides a fixed jaw or abutment. Below the fixed jaw 14 are rib extensions 15 and 16, the ends of which are integral with a laterally projecting lug 18 through which a conventional clamping screw 20 projects. The jaw 1 is thus provided with means by which it may be firmly anchored to a bench or table T, as shown in Figs. 1 and 2.

Where, as above noted, the use of an adapter is contemplated, either for a saw blade having an opening larger than one-half inch or a blade having a non-circular opening, the inner faces of the jaws 1 and 2 are recessed as indicated by 21 and 22, to accommodate such an adapter and the shape of the recessed areas is such that the actual clamping pressure is applied by the marginal portions of the inner faces against the corresponding portions of the saw blade. Thus, the blade, being clamped adjacent to its periphery, is more firmly held against vibration than would otherwise be the case.

A blade-supporting stud 24 is received by either pair of openings 3, 4 or 5, 6 and one end of this stud is formed with a square head 25 fitting between the ribs 11 and 12 which holds the stud against rotation. The other end of the stud is threaded to receive a clamping nut 26 which acts against the bosses 8 or 10, as the case may be, to clamp the saw blade S between the jaws 1 and 2.

In the embodiments shown in Figs. 1 and 2, the blade S has a diameter of six and one-half inches, for example, and a central opening of one-half inch, and hence the upper or eccentric openings 5 and 6 are used. Where a larger blade is used, e. g., a ten inch blade S' (Fig. 4) having either a three quarter inch opening or a non-circular opening, then an adapter 28 having a central opening of one-half inch is provided, as illustrated in Fig. 4.

The head 25 of stud 24 is drilled axially and threaded to receive a wing screw 30 and associated lock washers 31 which pivotally supports one end of an arm 32 on an axis concentric with the saw blade. The arm 32 consists of two slotted sections 34 and 35 which are clamped together by a wing nut 36 and a screw 38, the construction and arrangement of parts being such that the arm 32 may be extended or retracted so as to accommodate blades of different diameters.

The free end of the arm 32 carries a file or gauge black 40, here shown as consisting of a truncated unsymmetrical tetragonal pyramid adjustably secured to the section 35 by a clamping nut 42. When the gauge block 40 is correctly positioned with its truncated or pointed end against the blade S, its upper face 44 is in a plane parallel and closely spaced to the plane in which the back faces of alternate teeth *a* are to be filed, and the side face 45 is in a plane parallel and closely spaced to the plane in which the front faces of the alternate teeth *a* are to be filed.

In using the device a saw blade S to be sharpened is inserted between the jaws 1 and 2, as shown, and the clamping nut 26 tightened to hold the blade firmly. The gauge block 40 is then positioned with its pointed end against the blade so that the junction between this end and the top face 44 is approximately one-eighth inch below the back surface of one of the alternate teeth *a* and the junction between the same end and the side face 45 offset (counterclockwise in Fig. 1) relative to the front face of the same tooth *a*, whereupon the clamping screws 30 and 38 are tightened. With the gauge thus set a file F is drawn back and forth across the back surface of the tooth *a* for which the gauge has been set, the operator being careful to maintain the cutting surface of the file parallel to the adjacent gauge surface 44 of the block. After having filed the back surface, the operation is repeated on the front surface of the same tooth, the cutting surface of the file being held parallel to the gauge surface 45 of the block.

After having completed the filing of one alternate tooth, the clamping screw 30 is loosened sufficiently to permit the arm 32 to be swung to the next alternate tooth and the screw 30 is then tightened after which the operation is repeated. After having filed all accessible alternate teeth the clamp nut 26 is loosened to permit the saw blade S to be rotated so as to bring other unsharpened teeth into position, whereupon the nut 26 is tightened and the procedure again repeated. When all the alternate teeth *a* have been filed the nut 26, the jaw 2 and blade S are removed and then replaced with the blade S reversed, whereupon the procedure is repeated on the teeth *b*.

Since the gauge block 40 is at all times maintained in a fixed radial position, relative to the axis of the saw, the proper clearance and slope angles may be obtained merely by maintaining the file F at the same distance from the gauge surfaces 44 and 45. When operating on larger saws the openings 3 and 4 are used, but otherwise the procedure is the same.

While I have shown and described one desirable embodiment of the invention, it is to be understood that this disclosure is for the purpose of illustration and that various changes and modifications may be made without departing from the spirit and scope of the invention as set forth in the appended claims.

I claim:

1. A saw holding device for sharpening circular saws, comprising a pair of clamping jaws having aligned openings, a stud projecting through said openings on which a circular saw blade may be supported between said jaws, a pivotally mounted arm rotatably on an axis concentric with the saw blade, and a gauge block mounted on said arm, said gauge block having one face in a plane substantially parallel and closely spaced to the plane in which the front faces of alternate teeth of the blade are to be filed and a second face in a plane substantially parallel and closely spaced to the plane in which the back faces of said alternate teeth are to be filed.

2. A device as set forth in claim 1, wherein said arm is extensible so as to accommodate saws of different diameters.

3. A device as set forth in claim 2, wherein said block is adjustably mounted at the outer end of said arm.

4. A device as set forth in claim 1, wherein said block is adjustably mounted at the outer end of said arm.

5. A device as set forth in claim 1, wherein said block is in the shape of a truncated pyramid.

6. A device as set forth in claim 1, wherein said arm is mounted on said stud.

7. In a saw holding device for sharpening circular saws, a saw clamp comprising circular jaws having concentric openings and aligned eccentric openings, one of said jaws being formed with at least one rib extending from one side of the concentric openings to one side of the eccentric openings, a clamping stud constructed to project through either openings so as to support a circular saw blade between said jaws, one end of said stud having a head larger than said openings and formed with a flat engageable with said rib so as to prevent rotation, the opposite end of said stud projecting outwardly beyond the other of said jaws and being threaded, and a clamping nut carried by the threaded portion of said stud.

8. A device as set forth in claim 7, wherein a gauge member is pivotally mounted on the headed end of said stud.

References Cited in the file of this patent

UNITED STATES PATENTS

| | | |
|---|---|---|
| 905,924 | Reynolds | Dec. 8, 1908 |
| 2,657,594 | Frazier | Nov. 3, 1953 |